V. G. APPLE.
INSULATED BATTERY CELL.
APPLICATION FILED SEPT. 14, 1907.
954,370.
Patented Apr. 5, 1910.
2 SHEETS—SHEET 1.
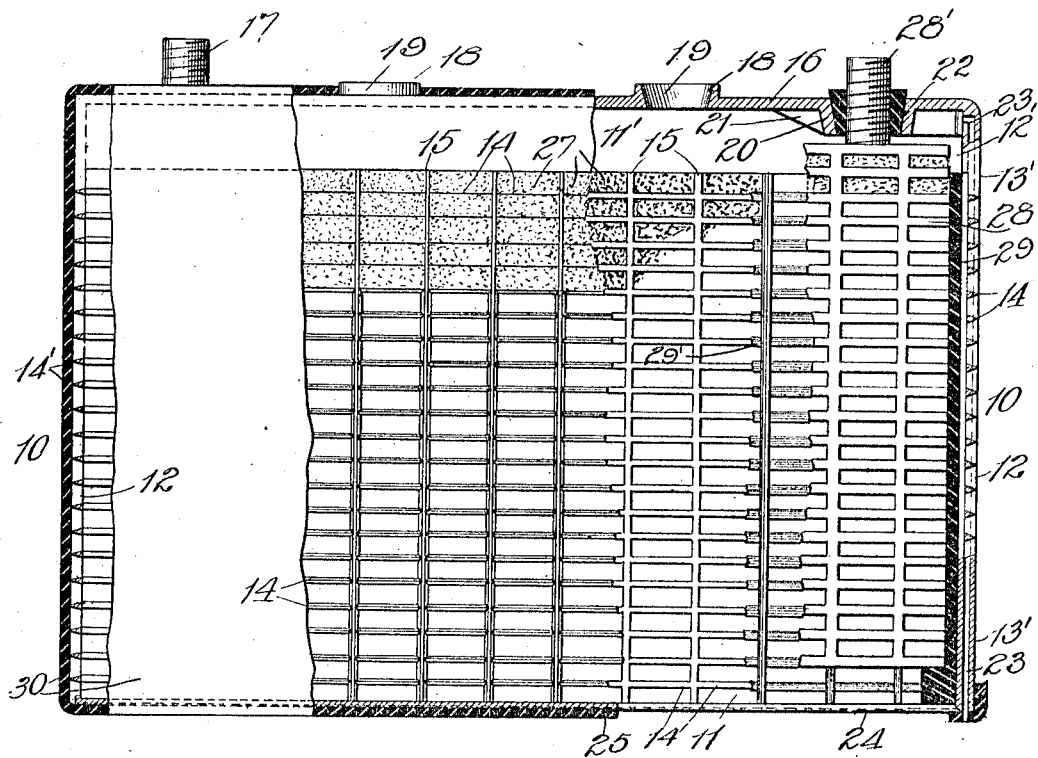
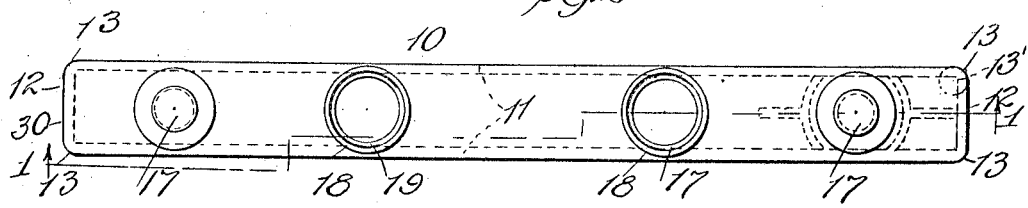
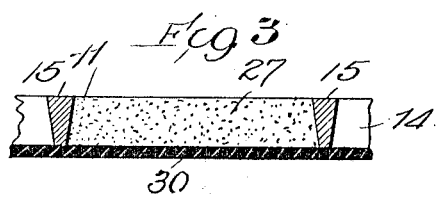
Witnesses
Carey R. White
Ray White
Inventor
Vincent G. Apple,
By Foree Bain and May
Attys

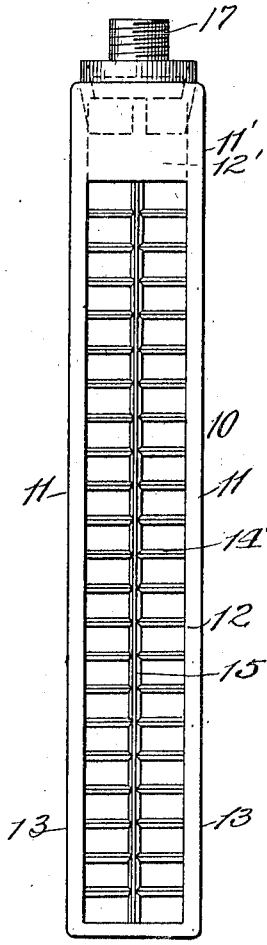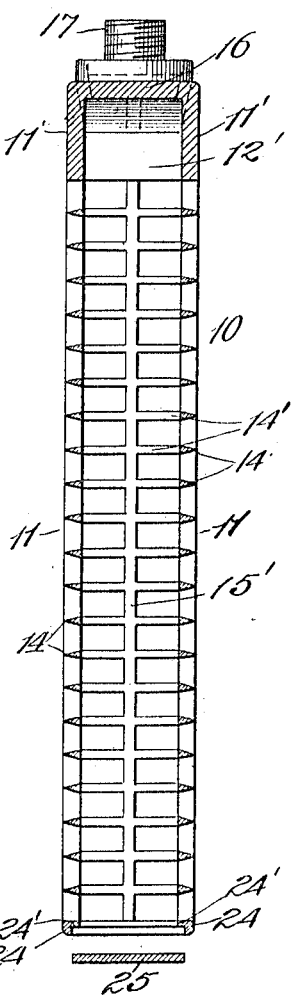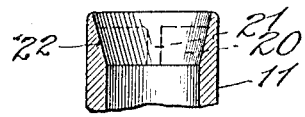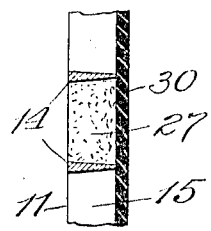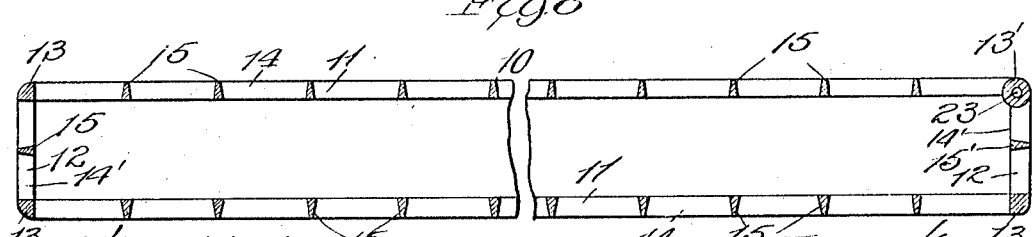

UNITED STATES PATENT OFFICE.

VINCENT G. APPLE, OF DAYTON, OHIO.

INSULATED BATTERY-CELL.

954,370.   Specification of Letters Patent.   Patented Apr. 5, 1910.

Application filed September 14, 1907. Serial No. 352,868.

*To all whom it may concern:*

Be it known that I, VINCENT G. APPLE, a citizen of the United States, residing at Dayton, in the county of Montgomery and State of Ohio, have invented certain new and useful Improvements in Insulated Battery-Cells, of which the following is a specification.

My invention relates to insulated battery cells, of the type wherein the metallic structure of the cell is exteriorly insulated throughout by a body of insulating material so applied thereto, as by vulcanization, as to form therewith a substantially unitary structure, as broadly covered in my prior patent No. 767,323, dated August 9th, 1904.

One of the salient objects of my present invention is to provide an improved construction of a battery cell of the characteristics described, particularly applicable to "lead bottle" storage batteries, and to this end my invention consists of the features of construction and arrangement of parts hereinafter more fully described and specified in the claims.

In the drawings, wherein I have illustrated a practical embodiment of my invention; Figure 1 is a side view of a battery with parts in elevation and parts in different sections, as indicated by line 1—1 in Fig. 2; Fig. 2 is a top plan view; Fig. 3 is an enlarged section on a horizontal plane of a fragment of the cell wall; Fig. 4 is an end view of the negative lead element or grid. Fig. 5 is a vertical section therethrough; Fig. 6 is a detail of a positive-terminal aperture; Fig. 7 is an enlarged sectional detail on a vertical line of the grid construction, and; Fig. 8 is a horizontal section of the grid.

Throughout the several views like numerals of reference refer always to like parts.

In the present embodiment of my invention I provide a unitary grid or shell in the form of a hollow rectangular parallelepipedon to constitute the negative element of a battery unit, the sides and ends whereof are integrally cast, and each of grill construction, presenting apertures for the reception of active material extending entirely through the grid wall and tapering from the exterior toward the interior surface thereof, such integral casting preferably including a top, provided with suitable apertures and appurtenances, useful in the finishing of the battery, made therein or connected therewith, and preferably having a bottom opening, through which the positive element may be inserted, adapted for easy closure in the completion of the cell. Furthermore such cell embodies, when completed, a covering or envelop, of insulating material, connected with the negative element by vulcanization or equivalent practice, for intimate and permanent union with the metal of the grid and the metallic or other active material wherewith the grid may be filled or pasted.

In the specific embodiment of my invention shown, 10 indicates in general the negative grid, preferably constructed with five of its six walls cast in an integral piece.

In the construction shown, 11—11 indicates side walls arranged in parallelism, and 12—12 end walls likewise in parallelism, preferably constructed in an integral piece to provide vertical corner posts 13, connected by horizontal parallel side ribs 14 and horizontal end ribs 14', which horizontal ribs are at suitable intervals traversed and united by vertical side ribs 15, and end ribs 15'. I have found it advantageous to make the vertical ribs heavier than the horizontal ribs to secure maximum strength with minimum interior exposure of the grill work of the grid. Both the vertical and horizontal ribs are preferably made to taper outwardly, so that the apertures and material spaces therebetween taper inwardly, as illustrated in Figs. 3 and 7.

The top of the grid is preferably made integral therewith and of solid construction, and to this end the walls 11—11 are provided with solid extensions 11' and the end walls 12 with extensions 12' united by a cover plate 16. The top 16 preferably has rigidly affixed therein in the casting operation a terminal screw 17, and preferably has made thereon companion exterior bosses 18, through which extend inwardly-tapering apertures 19, and also a deeper interior boss 20 strengthened by ribs 21, and having therein an inwardly tapering aperture 22, for the reception of the terminal member of the positive plate.

For venting the gases from the cell I provide a hollow post 13' at one corner of the cell, preferably burned to or made integral with the corner post. To afford such vent duct one of the corner posts, indicated as 13', which extends clear to the top 16 of the casing, is enlarged and has made therein a duct 23 extending to the interior of the casing directly below the top thereof, and at its bottom opening to the exterior of the grid in a downward direction.

The bottom edge of the grid is provided by a continuous integral band 24 formed to provide a shoulder 24' upon which may be seated a flat strip 25 of lead, which during the construction of the battery is burned in place to close the bottom of the grid.

In the completion of the grid structure during the manufacture of the battery the integral grilled structure described is first cast with its bottom open, as described, and is then "filled" of "pasted" with active material, generally indicated in the drawing as 27. Next the positive plate, fragmentarily indicated in Fig. 1 as 28, is inserted, with its terminal 28' projecting through and insulated from the external aperture 22 and the body of the plate suitably insulated as by suitable insulators 29, 29' from the surrounding grid, and then the bottom strip 25 is applied and burned in the grid.

30 indicates a covering of rubber or other composition, as described in my prior patent, vulcanized or otherwise intimately secured to the completed grid structure to form therewith substantially an inseparable construction covering completely the sides, ends and bottom of the cell, and so much of the top thereof as is necessary or desirable.

It will be understood that the duct 23 is continued through the covering of insulating material, and that the apertures 19 are left open for the introduction of the electrolyte and the expulsion of air.

It will be apparent that the construction described provides a very simple and cheap battery of the lead bottle type, easy to cast in one operation, requiring a minimum amount of joining of parts by burning, rigid and easy of manipulation in filling, and strong and impermeable in its completed condition by virtue of the intimate and substantially indestructible association of the impervious insulating covering with the metal of the grid and the active material.

Having thus described my invention, what I claim and desire to secure by Letters Patent, of the United States, is:

1. A battery cell providing a receptacle for a plate of opposite polarity, comprising an incasing hollow grid of rectangular parallelepipedal configuration having side and end walls, cast in an integral structure, consisting of corner posts united laterally by thin, separated, outwardly tapering, horizontal ribs, and vertical, outwardly tapering, separated ribs and leaving an opening at the bottom; a bottom uniting said walls, and an insulating envelop of material susceptible to vulcanization vulcanized to said grid and bottom, covering them and entirely closing the spaces between the ribs, said envelop being intimately and permanently connected with the grid and the bottom.

2. A battery cell providing a receptacle for a plate of opposite polarity, comprising an integral open bottomed shell having side, end and top walls, cast in one piece, said side walls being provided with inwardly tapering apertures extending entirely therethrough, a bottom member associated with said casting and an envelop of insulating material vulcanized to said casting and bottom to cover the sides, ends and bottom.

3. In a battery cell providing a receptacle for a plate of opposite polarity, an open bottomed cast single piece grid or shell, having grilled side and end walls and an integral top, said top having therein suitable apertures, and having permanently connected therewith a terminal member; a bottom member tightly secured in the open bottom of said grid; and an insulating envelop vulcanized to the side, end and bottom walls for permanent and intimate association therewith.

4. In a battery cell, a cast grid comprising side walls, constructed to receive and support active material, end walls, and a hollow part fixed to the grid provided with an aperture opening to the interior of the grid below the top, and with a bottom vent aperture to vent gases downward from the top of the cell's interior, and an insulating envelop intimately and permanently vulcanized to said grid, providing a vent opening registering with the opening in the hollow part aforesaid.

5. In a battery cell, a cast, one-piece, hollow, rectangular parallelepipedal grid, for uniform polarity; said hollow grid comprising a top wall, and side and end walls of grid construction and being open at its bottom to receive a plate of opposite polarity, an electric terminal upon said top wall, and a separable plate for closing the bottom opening.

6. In a battery cell for the reception of a plate of opposite polarity, a grid consisting of side walls and end walls, some of said walls being of grill construction comprising narrow, outwardly-tapering, horizontal and vertical ribs, separated by spaces extending entirely through the wall and top, providing suitable apertures including an open bottom, all in a single integral casting.

In testimony whereof I hereunto set my hand in the presence of two witnesses.

VINCENT G. APPLE.

In the presence of—
N. E. SNYDER,
H. B. BATES.